United States Patent
Vinogradov et al.

(10) Patent No.: US 11,221,461 B2
(45) Date of Patent: Jan. 11, 2022

(54) INTELLIGENT METHOD OF TRACKING FOCUS IN MACHINE VISION APPLICATIONS

(71) Applicant: ZEBRA TECHNOLOGIES CORPORATION, Lincolnshire, IL (US)

(72) Inventors: Igor Vinogradov, Oakdale, NY (US); David D. Landron, Coram, NY (US); Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 46 days.

(21) Appl. No.: 16/824,368

(22) Filed: Mar. 19, 2020

(65) Prior Publication Data

US 2021/0294071 A1    Sep. 23, 2021

(51) Int. Cl.
| | |
|---|---|
| G02B 15/14 | (2006.01) |
| G02B 7/10 | (2021.01) |
| G02B 7/02 | (2021.01) |
| G03B 13/36 | (2021.01) |
| G02B 3/14 | (2006.01) |

(52) U.S. Cl.
CPC .............. *G02B 7/102* (2013.01); *G02B 3/14* (2013.01); *G02B 7/023* (2013.01); *G03B 13/36* (2013.01)

(58) Field of Classification Search
CPC .......... G02B 7/102; G02B 3/14; G02B 7/023; G03B 13/36
USPC ........................................................ 359/694
See application file for complete search history.

(56) References Cited

U.S. PATENT DOCUMENTS

| | | | |
|---|---|---|---|
| 2010/0243862 A1 | 9/2010 | Nunnink | |
| 2014/0186017 A1* | 7/2014 | Shibata | G03B 5/00 396/55 |
| 2017/0078549 A1 | 3/2017 | Emtman et al. | |
| 2018/0046062 A1 | 2/2018 | Fisher et al. | |
| 2019/0104302 A1 | 4/2019 | Gladnick et al. | |

OTHER PUBLICATIONS

International Search Report and Written Opinion for International Application No. PCT/US2021/023316 dated Jun. 22, 2021.

* cited by examiner

*Primary Examiner* — James C. Jones
(74) *Attorney, Agent, or Firm* — Yuri Astvatsaturov

(57) ABSTRACT

Methods and systems for tracking focus of an adjustable variable focus lens-based imaging system are disclosed. An example method includes identifying an initial focus position of an adjustable variable focus lens assembly and determining focusing parameters corresponding to that focus position. The focusing parameters are compared to a lens behavior model and a new, compensated focus position of the lens assembly is determined correcting for changes in lens assembly performance. A small window focusing sweep range, between forward and aft positions, may also be adjusted based on the lens behavior model to better identify the compensated focus position.

36 Claims, 3 Drawing Sheets

INTELLIGENT METHOD OF TRACKING FOCUS IN MACHINE VISION APPLICATIONS

BACKGROUND

Machine vision is use of automated imaging-based inspection and analysis for such applications as part inspection, process control, and robot guidance. In typical machine vision systems, focusing distance of an imaging system is fixed. If necessary, the focus has to be manually adjusted to a particular distance to focus on an object of interest. However, manual focusing requires an external computer and display for an operator. While an autofocus system can alleviate some of the limitations of manual focus, autofocus systems tend to be slow and cannot be used effectively in a moving system such as a conveyer belt. In a presence of multiple objects within the field of view (FOV) of an imager, an autofocus algorithm may select a wrong object to focus on, which may result in a blurry image of an intended object of interest.

Some have proposed liquid lens assemblies to help speed up autofocusing. However, liquid lens present an entirely new set of problems. In particular, over time, in response to aging and temperature changes, the focus of a liquid lens will drift from its held position. In conjunction with longer refocusing delays (30-40 ms for a full sweep) and the fact that there is no feedback, using a Liquid Lens in fixed imaging poses particular challenges. Some have proposed operating liquid lens over a narrow, reduced temperature range or below a maximum temperature range. Others accept these focus drift errors as unsolvable and then merely advise their customers of the likely chances for performance errors. Accordingly, there is a need for solutions that track the ageing of a liquid lens and the drift of liquid lens over time and over temperature and compensate for the same.

SUMMARY

In an embodiment, the present invention is a computer-implemented method for tracking focus of an adjustable variable focus lens-based imaging system, the method comprises: identifying, in the imaging system, an initial fixed focus position of an adjustable variable focus lens assembly of the imaging system for capturing an image of an object; determining one or more focusing parameters of the adjustable variable focus lens assembly for the initial fixed focus position and comparing the one or more focusing parameters to a lens behavior model for the adjustable variable focus lens assembly; determining a compensated fixed focus position of the imaging system based on the comparison to the lens behavior model; and capturing, via the imaging system, at least one image of the object at the compensated fixed focus position.

In accordance with an example, a method for tracking focus of an adjustable variable focus lens-based imaging system is provided. The method includes identifying, in the imaging system, an initial fixed focus position of an adjustable variable focus lens assembly of the imaging system for capturing an image of an object; and determining one or more focusing parameters of the adjustable variable focus lens assembly for the initial fixed focus position and comparing the one or more focusing parameters to a lens behavior model for the adjustable variable focus lens assembly. The method further includes determining a compensated fixed focus position of the imaging system based on the comparison to the lens behavior model; and capturing, via the imaging system, at least one image of the object at the compensated fixed focus position.

In some examples, the one or more focusing parameters includes at least one of time, current temperature of the adjustable variable focus lens assembly, diopter of the adjustable variable focus lens assembly, voltage associated with the initial fixed focus position, voltage sweep associated with the initial fixed focus position, and modulation transfer function of at least a portion of an image captured by the imaging system at the initial fixed focus position.

In some examples, the compensated fixed focus position of the imaging system based on the comparison to the lens behavior model is determined by identifying a focusing sweep range defined by a forward focus position forward of the initial fixed focus position and an aft focus position aft of the initial fixed focus position; determining a compensated forward focus position and a compensated aft focus position based on the comparison to the lens aging model; capturing, via the imaging system, a plurality of images of the object at focus positions at and/or between the compensated forward focus position and the compensated aft focus position; and determining the compensated fixed focus position as one of the focus positions.

In some examples, the initial fixed focus position is associated with an initial reference voltage, and determining the compensated fixed focus position of the imaging system includes: based on the comparison to the lens behavior model, determining a forward focus position voltage and an aft focus position voltage; capturing, via the imaging system, a plurality of images of the object at different focus positions by sweeping the imaging system across voltages at and/or between the forward focus position voltage and the aft focus position voltage; and determining the compensated fixed focus position as one of the different focus positions.

In some examples, the initial fixed focus position is associated with an initial reference voltage, and determining the compensated fixed focus position of the imaging system includes: identifying a focusing sweep voltage range defined by a forward focus position voltage corresponding to a forward focus position forward of the initial fixed focus position and by an aft focus position voltage corresponding to an aft focus position aft of the initial fixed focus position; determining a compensated forward focus position voltage and a compensated aft focus position voltage based on the comparison to the lens behavior model; capturing, via the imaging system, a plurality of images of the object at different focus positions by sweeping the imaging system across voltages at and/or between the forward focus position voltage and the aft focus position voltage, wherein the different focus positions are between +1 diopter and −1 diopter of a center focus position; and determining the compensated fixed focus position as one of the different focus positions.

In some examples, the lens behavior model includes time based compensation data, temperature based compensation data, diopter based compensation data, voltage based compensation data, voltage sweep based compensation data, and/or modulation transfer function based compensation data.

In some examples, the adjustable variable focus lens assembly includes a liquid lens.

In some examples, the lens behavior model is an aging model that includes historical data for the one or more focusing parameters of the adjustable variable focus lens assembly.

In some examples, the lens behavior model is a thermal model that includes thermal data for the one or more focusing parameters of the adjustable variable focus lens assembly.

In some examples, the lens behavior model is a drift model that includes lens drift data for the one or more focusing parameters of the adjustable variable focus lens assembly.

In some examples, comparing the one or more focusing parameters to the lens behavior model includes; capturing a plurality of images of the object and identifying a feature of interest in the plurality of images; determining a contrast or modulation transfer function corresponding to the feature of interest for each of the plurality of images; determining a change in the contrast or the modulation transfer function between the plurality of images; and comparing the change in the contrast or the modulation transfer function to the lens behavior model and determining a change in the one or more focusing parameters corresponding to the change in the contrast or the modulation transfer function.

In accordance with another example, an imaging system includes: an imaging assembly having an adjustable variable focus lens assembly; one or more processors; and a non-transitory machine-readable memory storing machine-readable instructions that, when executed by the one or more processors, cause the imaging system to: identify an initial fixed focus position of the adjustable variable focus lens assembly for capturing an image of an object; determine one or more focusing parameters of the adjustable variable focus lens assembly for the initial fixed focus position and compare the one or more focusing parameters to a lens behavior model for the adjustable variable focus lens assembly; determine a compensated fixed focus position of the imaging system based on the comparison to the lens behavior model; and capture at least one image of the object at the compensated fixed focus position.

In some examples, the imaging assembly is a barcode reader. In some examples, the imaging assembly is a machine vision system.

In accordance with another example, a machine vision method includes: identifying, in a machine vision system having an adjustable variable focus lens assembly, one or more current operating conditions of the adjustable variable focus lens assembly, the adjustable variable focus lens assembly having a first operating parameter value set; comparing the one or more current operating conditions to a lens behavior model for the adjustable variable focus lens assembly; in response to the comparison, determining a compensated parameter value set for compensating for age related changes to the adjustable variable focus lens assembly; and capturing, via the machine vision system, at least one image of an object using the compensated parameter value set.

In accordance with another example, a machine vision system including: an imaging assembly having an adjustable variable focus lens assembly; one or more processors; and a non-transitory machine-readable memory storing machine-readable instructions that, when executed by the one or more processors, cause the machine vision system to: identify one or more current operating conditions of the adjustable variable focus lens assembly, the adjustable variable focus lens assembly having a first operating parameter value set; compare the one or more current operating conditions to a lens behavior model for the adjustable variable focus lens assembly; and in response to the comparison, determine a compensated parameter value set for compensating for age related changes to the adjustable variable focus lens assembly; and capture, via the machine vision system, at least one image of an object using the compensated parameter value set.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
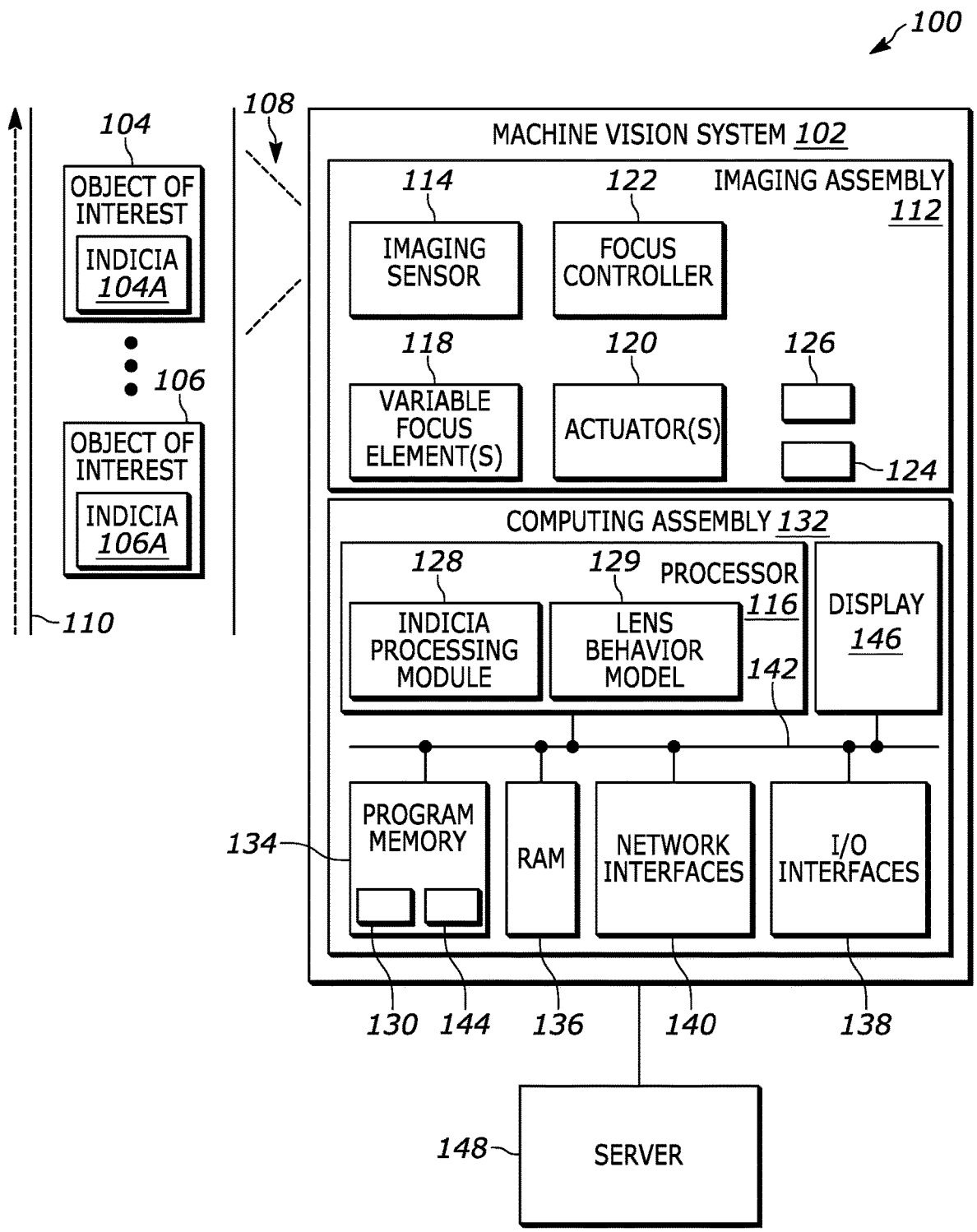
FIG. 1 illustrates a block diagram of a machine vision system for implementing example methods and/or operations described herein including techniques for tracking and adjusting of an adjustable variable focus lens assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, a method, and related systems and devices, are described for tracking and adjusting focus of an adjustable variable focus lens-based imaging system in response to changes in lens behavior over time.

Conventionally, imaging systems such as machine vision systems rely upon fixed focus positions between an object and an image sensor to perform high resolution image analysis. Machine vision systems are often deployed to analyze extremely small features that require the use of high magnification of a feature of interest. The result, however, is that machine vision systems are highly susceptible to conditions that can change the focus position of an imager. This is particularly true for variable focus lens assemblies, such as liquid lens. These lens assemblies allow for fine and relatively fast adjustment to a fixed focus position. However, these lens assemblies are susceptible to performance changes due to age (time), temperature, drift, lens quality.

The focus position for a given drive voltage may change depending on temperature or the age of the liquid lens, for example.

With examples herein, the focus position and focus operation of a variable focus lens assembly is tracked and compared to a lens behavior model. Using the comparison, compensated new focus positions may be determined for the variable lens assemblies. To determine these compensated new focus positions, for example, focusing parameters for the variable focus lens assembly may be measured and compared against one or more lens behavior models. Example focusing parameters are measurable parameters of operation or function of the variable lens assembly, and include parameters such as current time, current temperature, diopter of the adjustable variable focus lens assembly, applied voltage, contrast of at least a feature of an image, a modulation transfer function (MTF) of at least a feature of an image. Any measurable parameter of operation of the variable focus lens assembly that changes under different operating conditions may be used to and built into one or more lens behavior models for comparison purposes.

In some examples, the tracking and compensation is performed using historical data on lens performance that is included in the lens behavior model, where such models may be aging models that indicate performance over time, thermal models that indicate performance at different temperatures, drift models that indicate performance under different positions, other models of lens performance, or any combination thereof.

Moreover, in some examples, the present techniques provide periodic fine tuning of the fixed focus position of a variable lens assembly by adjusting a small window of focusing sweep based on measuring an image characteristic such as an optical merit function, like MTF or contrast. In examples, this focusing sweep is adjusted to compensate for changes in variable focus lens assembly performance as determined from the lens behavior model. The focusing sweep refers to a predefined, limited focusing range that is used in machine vision systems to compensate for errors and lens variation, while finding and maintaining a fixed focus position. Thus, in some examples of the present technique, this limited focusing sweep range may be adjusted to correct for aging effects, thermal effects, drift effects, etc. affecting a lens assembly. The forward and aft focus positions of the sweep may be corrected, as well as the midpoint frequency for the sweep range. In some examples, the focusing sweep is +/−1 diopter of optical power.

Any number of optical merit functions or other focusing parameters may be used by the lens behavior model to determine new, compensated focus positions of a lens assembly. MTF is a measure of the ability of an optical system to transfer various levels of detail from object to image and demonstrates performance, which may be measured in terms of contrast or optical modulation.

In various examples, the present techniques compensate for short term lens performance changes (e.g., due to thermal changes) by adjusting small window focusing sweeps to more accurately determine focus position, while also compensating for long term lens performance changes, such as resulting from aging.

FIG. 1 illustrates an example environment 100 capable of implementing operations of the example methods described herein, as may be represented by the flowcharts of the drawings that accompany this description. In the illustrated example of FIG. 1, the environment 100 includes a machine vision system 102 where objects of interest (two of which are designated at reference numerals 104 and 106) are moved through a FOV 108 of the machine vision system 102 or placed in the FOV 108 for imaging and inspection. For example, the objects of interest 104, 106 may be moving on a scanning surface 110 such as on a conveyor belt, along an assembly line, etc. The objects of interest 104, 106 may be moved continuously relative to the FOV 108 of the machine vision system 102, or moved in a discretized manner where at least part of the time an object of interest 104, 106 is held still for a period of time sufficient to allow one or more images to be captured of the object of interest 104, 106.

While the example environment 100 is describes as including the machine vision system 102, in other examples, the system 102 may be implemented in as a barcode reader, such as a handheld barcode reader or bi-optic barcode reading having a horizontal tower and a vertical platter each configured to perform barcode imaging.

To capture images, the example machine vision system 102 includes an imaging assembly 112 having any number and/or type(s) of imaging sensor 114 (e.g., a complementary metal-oxide semiconductor (CMOS) imaging array). The imaging sensor 114 under control of, for example, a processor 116 captures one or more images of an object of interest 104, 106.

To focus on objects of interest, the example imaging assembly 112 includes any number and/or type(s) of variable focus elements 118 positioned between the imaging sensor 114 and a window (not shown) of the machine vision system 102, and any number and/or type(s) of actuators 120 to activate, operate, etc. the variable focus elements 118 under the control of a focus controller 122. Example variable focus elements 118 include, but are not limited to, a liquid lens, a voice coil motor, etc. An example liquid lens is the Arctic 25H0-Z available form Parrot Drones SAS Confidential of France. Example actuators 120 include a focusing lens drive, a shift lens drive, a zoom lens drive, an aperture drive, angular velocity drive, voice coil motor drive, etc. In the illustrated example, the processor 116 sets one or more focusing parameters, two of which are designated at reference numbers 124 and 126, that the focus controller 122 uses to control the actuators 120. In this manner, the processor 116 can control the focus distance to an imaging plane of the imaging assembly 112 to an intended or needed focus distance. In some examples, the imaging assembly 112 is configured such that if the imaging assembly 112 has an autofocus module or autofocus operation that the autofocus operation is disabled for at least one image capture operation and focus distance is controlled by the processor 116 via the focusing parameters 124, 126 for that image capture operation.

To identify to the machine vision system 102 the focus distance(s) at which an object of interest 104, 106 is to be imaged, objects of interest 104, 106 have one or more respective indicia, two of which are designated at reference numerals 104A and 106A. In some examples, more than one indicia 104A, 106A is associated with an object of interest 104, 106. Additionally or alternatively, an indicia 104A, 106A may represent more than one focus distance for more than one object of interest 104, 106. When the indicia 104A, 106A represent multiple focus distances for an object of interest 104, 106, the focus distances may be associated with different portions, parts, members, aspects, etc. of an object of interest 104, 106. An indicia 104A, 106A need not be positioned at the focus distance(s) represented by the indicia 104A, 106A. For example, an indicia 104A, 106A may be sized and placed to be recognized without the use of auto-focus, the indicia 104A, 106A may be placed at a default focus distance the machine vision system 102 uses to image and identify indicia 104A, 106A, etc. Indicia 104A, 106A may be placed on an object of interest 104, 106, alongside an object of interest 104, 106, etc. Example indicia 104A, 106A include, but are not limited to, a barcode (one-dimensional (1D), two-dimensional (2D) or three-dimensional (3D)), a fiducial mark, direct part marking (DPM), or any other special designated pattern that may be used to convey information.

In some examples, the imaging assembly 112 is fixedly mounted at a known location and is selectively focusable on objects of interest 104, 106 that are different distances away from the known location based on focus distances encoded in indicia 104A, 106A. In some examples, the imaging assembly 112 is moveably mounted and positionable (e.g., in one, two or three dimensions) at different known positions, and is focused on objects of interest 104, 106 that are different distances away relative to a current known position based on focus distances encoded in indicia 104A, 106A. In some instances, an indicia 104A, 106A encodes imaging assembly position and focus distance(s). The indicia 104A, 106A may further encode other imaging properties such as zoom, aperture, etc.

When an indicia processing module 128 recognizes an indicia 104A, 106A in an image as a focus adjustment trigger, the indicia processing module 128 decodes the indicia 104A, 106A to obtain predetermined payload data or information encoded in the indicia 104A, 106A. Example payload data or information includes focus distances to imaging planes, size or dimensions of an object of interest 104, 106. The payload data or information may be encoded in the indicia 104A, 106A according to any past, present or future industry standard such as Code 39 barcodes, GS1 barcodes, Interleaved 2 of 5 (ITF) barcodes, etc. The processor 116 configures the imaging assembly 112 to each of the identified focus distances. In some examples, the processor 116 queries a focusing parameter database 130 to obtain the focusing parameters 124, 126 corresponding to the focus distance identified by a captured indicia 104A, 106A. In some examples, the known dimension(s) of an indicia 104A, 106A, the current known FOV, and the size of the indicia 104A, 106A in an image (e.g., in pixels) can be used to determine (e.g., calculate, estimate, etc.) the distance to the indicia 104A, 106A. In some examples, the FOV is considered constant or fixed regardless of focus distance. In some examples, the focus distance can be calibrated using a fixed focus and calibrated FOV, for example, the focus position is set to a particular distance and maintained in place during operation of the system 102. In some examples, as the system 102 is cycled off and back on, the system maintains (or returns to) to this same fixed focus distance.

For each identified focus distance to an imaging plane (i.e., the focus position), the processor 116 writes, stores, etc. the corresponding focusing parameters 124, 126 to the imaging assembly 112, and controls the focus controller 122 to set the focus distance of the imaging assembly 112 according to the focusing parameters 124, 126, and fix (e.g., maintain, hold, lock, etc.) the focus position at a distance.

Figure 2:
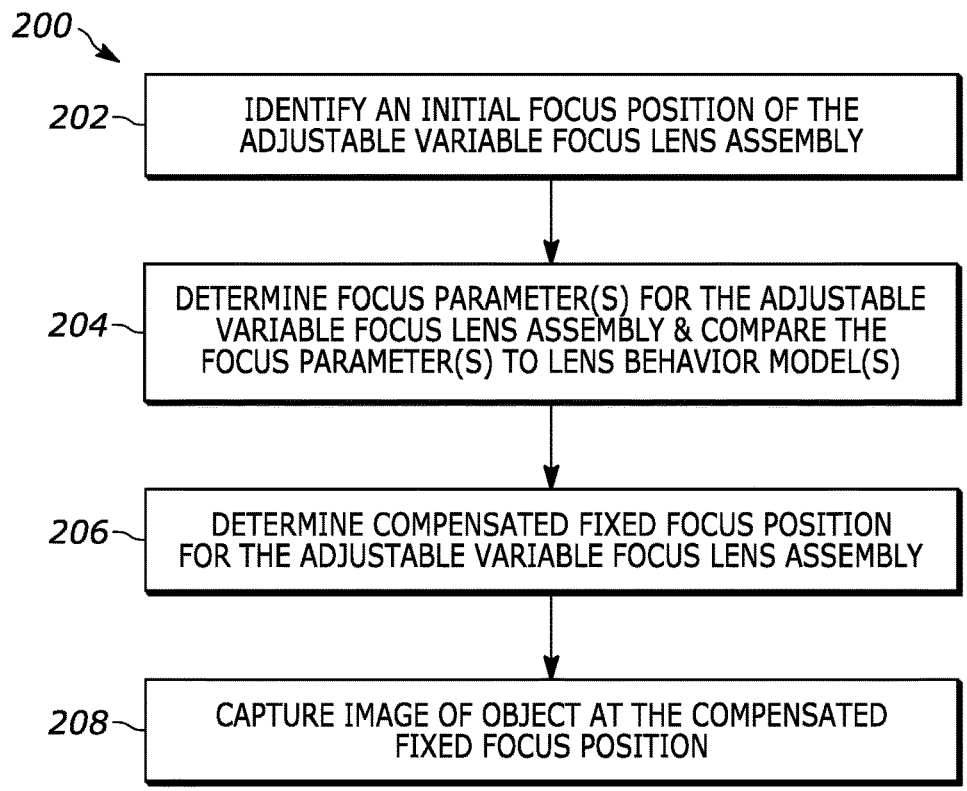
FIG. 2 illustrates a block diagram of a flowchart representing an example process for tracking and adjusting of an adjustable variable focus lens assembly as may be implemented by the machine vision system of FIG. 1.
Figure 3:
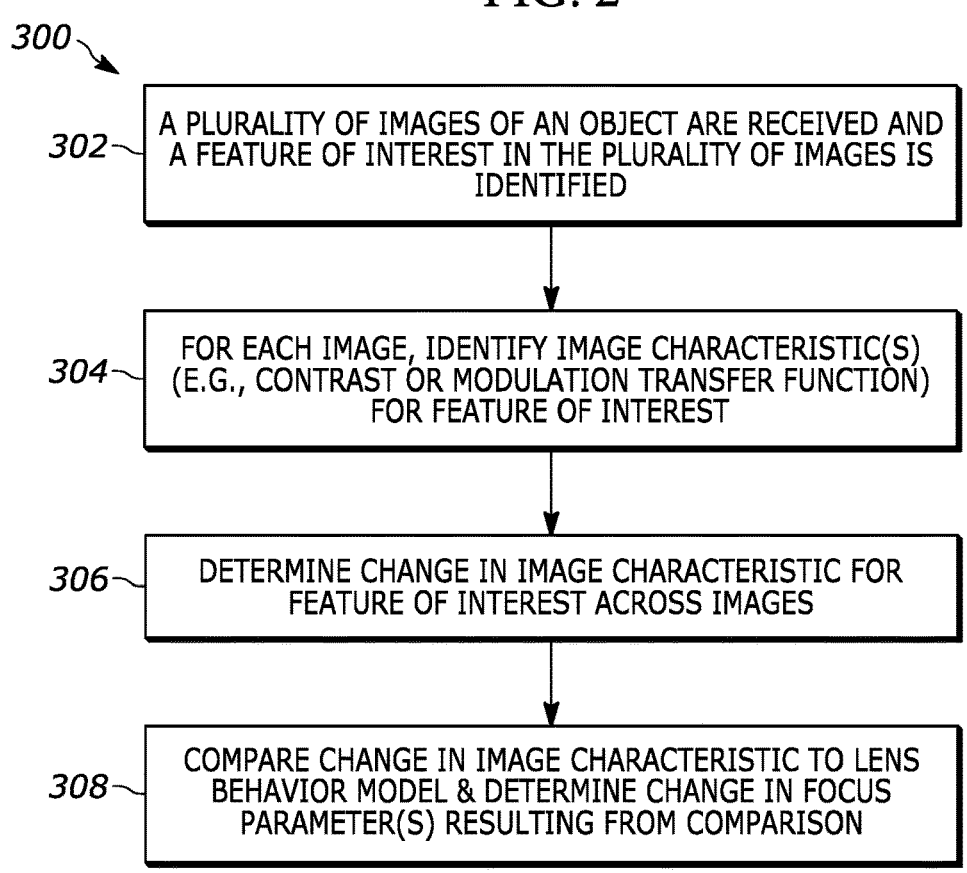
FIG. 3 illustrates is a block diagram of a flowchart representing an example process for determining focusing parameters and comparing those focusing parameters to a lens behavior model as may be executed by the process in FIG. 2, in implementing example methods and/or operations described herein.
Figure 4:
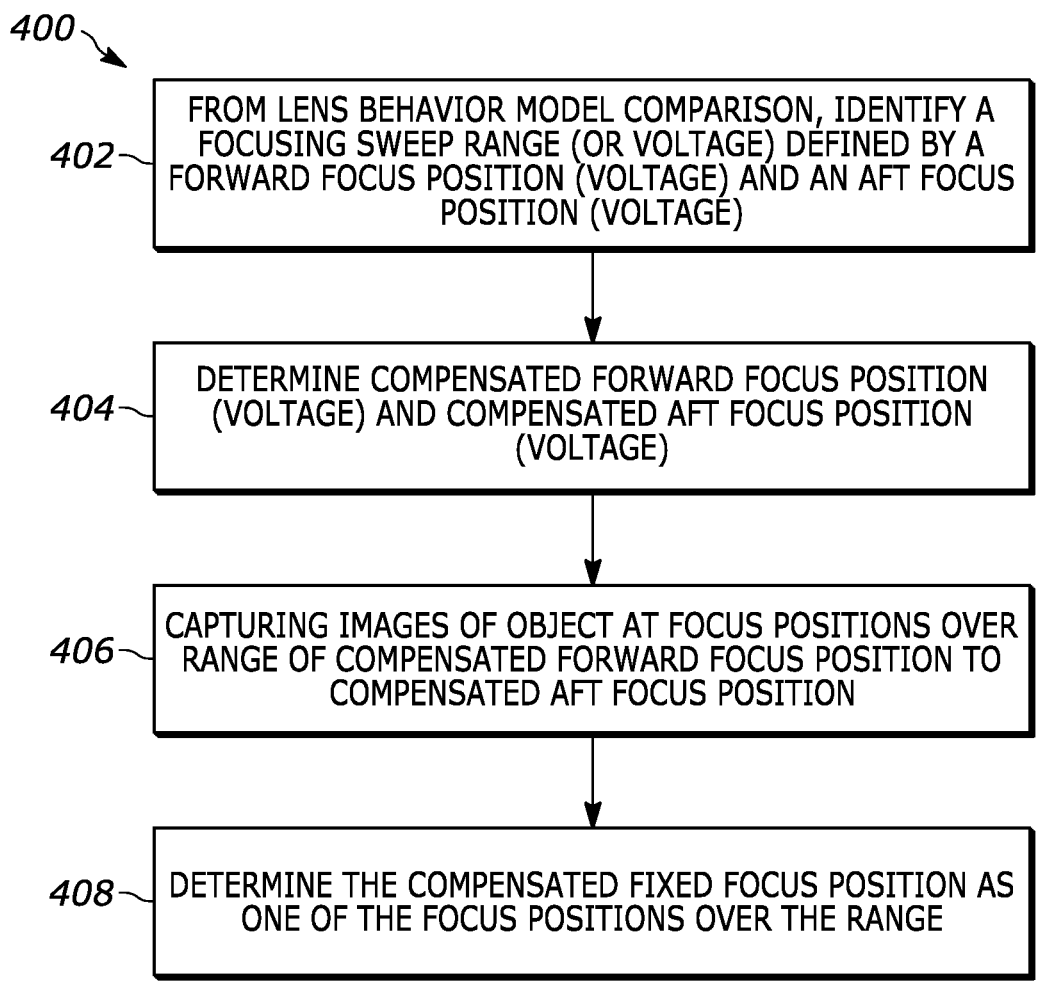
FIG. 4 illustrates a block diagram of a flowchart representing an example process for determining a new focus position from a compensated focusing sweep range as may be executed by the process in FIG. 2, in implementing example methods and/or operations described herein.

The process 116 further tracks the focus of the variable focus elements 118 and compensates focus position, in accordance with the example methods described herein, as may be represented by the flowcharts of the drawings that accompany this description, including those of FIGS. 2-4. In the illustrated example, a lens behavior model 129 is provided and includes historical data and/or performance data, and in some examples algorithms, for comparing focusing parameters 126 and 124 to determine when adjustments to focus position are warranted to compensate for changes in performance of the elements 118. The lens behavior model 129 may compare any number of focusing parameters from the imaging system 112, including those controlling operating of the actuators 120, data from the focus controller 122, and feedback data from the variable focus elements 118.

Once the focus distance has been set, the processor 116 controls the imaging sensor 114 to capture one or more images of an object of interest 104, 106. Because the focus distance is known a priori to correspond to the object of interest 104, 106, a captured image will be properly focused for one or more desired aspects of the object of interest 104, 106, and non-desired aspects or other objects cannot result in improper focus. In some examples, the number of images to capture is encoded in the indicia 104A, 106A. When a number of images is to be captured, the indicia 104A, 106A may further encode times between image captures to accommodate, for example, movement of a conveyor belt, assembly line, etc. The time duration that focusing parameters 124, 126 are held may be until another or subsequent indicia focus adjustment trigger is identified. In examples including auto-focus, the focus distance encoded in an indicia 104A, 106A can be used to set a starting focus distance for auto-focus to, for example, accommodate variations in object of interest to imaging sensor separation.

In the illustrated example of FIG. 1, the machine vision system 102 includes a computing assembly 132 that includes one or more processors (one of which is designated at reference numeral 116), program memory 134, random-access memory (RAM) 136, input/output (I/O) interfaces 138, and network interfaces 140, all of which are interconnected via an address/data bus 142. The program memory 134 may store software and/or instructions 144, which may be executed by the processor 116. Different portions of the example machine vision system 102, for example, the imaging assembly 112 and the computing assembly 132, may be implemented separately by different computing systems. Thus, the processor 116 and the focus controller 122 may be implemented as two different processors and/or controllers. However, in other examples, the processor 116 and the focus controller 122 are implemented by the same processor and/or controller.

The processor 116 and the focus controller 122 of the illustrated example may be hardware, and may be semiconductor based (e.g., silicon based) devices. Example processors 116 and focus controller 122 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. In this example, the processor 116 implements the indicia processing module 128. In some examples, the processor 116 implements instructions that inspect objects of interest 104, 106 using images taken based on focus distances determined from indicia 104A, 106A.

The program memory 134 may include any number and/or type(s) of volatile and/or non-volatile storage media or disks storing the software, machine- or computer-readable instructions, or computer- or machine-executable instructions 144, and the focusing parameter database 130. The software and instructions 144 may be executed by the processor 116 to implement the indicia processing module 128, and inspect objects of interest 104, 106 using images taken based on focus distances determined from indicia. The software and instructions 144 may be stored on separate non-transitory computer- or machine-readable storage mediums or disks, or at different physical locations.

The memories 134, 136 include any number or type(s) of volatile or non-volatile non-transitory computer- or machine-readable storage media or disks, such as a semiconductor memory, a magnetically readable memory, an optically readable memory, a hard disk drive (HDD), an optical storage drive, a solid-state storage device, a solid-state drive (SSD), a read-only memory (ROM), a RAM, a compact disc (CD), a compact disc read-only memory (CD-ROM), a digital versatile disk (DVD), a Blu-ray disk, a redundant array of independent disks (RAID) system, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

The I/O interfaces 138 may include any number and/or type(s) of different types of I/O circuits or components that enable the processor 116 to communicate with peripheral I/O devices. Example I/O interfaces 138 include a universal serial bus (USB), a Bluetooth® interface, a near field communication (NFC) interface, an infrared transceiver, and/or a PCI express interface. The peripheral I/O devices may be any desired type of I/O device such as a keyboard, a display 146 (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The machine vision system 102 includes one or more network interfaces 140 for connecting the machine vision system 102 to a server 148. These devices may be connected via any suitable communication means, including wired and/or wireless connectivity components that implement one or more past, present or future industry communication protocol standards like, for example, a TCP/IP interface, a Wi-Fi™ transceiver (according to the 802.11 family of standards), an Ethernet transceiver, a cellular network radio, a satellite network radio, a cable modem, a digital subscriber line (DSL) modem, a dialup modem, or any other suitable communication protocols or standards.

In some embodiments, the imaging assembly 112 is implemented separately from other parts of the machine vision system 102 (e.g., separately from the computing assembly 132) and is coupled to the other parts of the machine vision system 102 via the I/O interfaces 138 and/or the network interfaces 140. In some such embodiments, the other parts of the machine vision system 102 are implemented on a cloud-based platform at a remote location.

While an example machine vision system 102 is illustrated in FIG. 1, one or more of the elements, processes and/or devices illustrated in FIG. 1 may be combined, divided, re-arranged, omitted, eliminated and/or implemented in any other way. For example, the processor 116 and the focus controller 122 may be implemented by the same programmable processor, programmable controller, GPU, DSP, an ASIC, a PLD, an FPGA, an FPLD, etc. Further, the machine vision system 102 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the server 148 includes, among other things, program memory storing software or instructions that, when executed by a processor of the server 148 cause the server 148 to inspect objects of interest 104, 106 based on images taken by the machine vision system 102 using focus distances determined from indicia 104A, 106A.

In some embodiments, the server 148 (and/or other connected devices) may be located in the same location as the machine vision system 102. In other embodiments, server 148 (and/or other connected devices) may be located at a remote location, such as on a cloud-platform or other remote location. In still other embodiments, server 148 (and/or other connected devices) may be formed of a combination of local and cloud-based computers.

To track focusing parameters and adjust a variable focus, a process 200 may be implemented by the machine vision system 102. In the illustrated example, the process 202 identifies an initial focus position of a variable focus lens assembly, such as for example, the variable focus elements 118 elements. The initial focus position may correspond to the focus position of the variable focus lens assembly upon startup of the system 100 or upon activation of an object imaging process for the machine vision system 102.

A process 204 determines one or more focusing parameters for the adjustable variable focus lens assembly, where these focusing parameters may include settings for that variable focus lens assembly that result in the initial focus position. For example, the process 204 may determine these focusing parameters from control signals sent by the focus controller 122 to the actuators 120 controlling the operation of the variable focus elements 118. The process 204 may determine the focusing parameters from feedback loop data of the actuators 120 indicating the position of a focusing lens drive, a shift lens drive, a zoom lens drive, an aperture drive, angular velocity drive, voice coil motor drive, or other drives controlling the position and operation of the variable focus elements 118. In some examples, the process 202 may determine the focusing parameters from position sensors in the variable focus elements 118. Example focusing parameters include one or more of the current time, current temperature of the adjustable variable focus lens assembly, diopter of the adjustable variable focus lens assembly, applied voltage that sets the initial fixed focus position, and a voltage sweep associated with the initial fixed focus position (e.g., a range of voltages and the sweep up or sweep down in voltage that led to the current voltage). In some examples, the focusing parameters may be optical parameters such as the optical contrast or modulation transfer function (MTF) of at least a portion of an image captured by the machine vision system 102. The contrast or MTF may correspond to a feature of interest in an image, such as the indicia 104A and 106A on objects 104 and 106, respectively. Example indicia include barcodes, DPMs, or fiducial markers on an object. Yet other features of interest may be edges on an object, protrusions on an object, and/or indentations on an object.

To adjust the focus of the adjustable variable focus lens assembly, the process 204 compares the focusing parameter(s) to a lens behavior model, which contains one or more models of the behavior of focusing parameters under different conditions. The lens behavior models may be data files that store different focusing parameters and different settings for those focusing parameters under different operating conditions of a machine vision system, such as different operating conditions of the adjustable variable focus lens assembly (collectively this data form various types of compensation data). In some examples, a lens behavior model includes time compensation data, temperature compensation data, diopter compensation data, voltage compensation data, voltage sweep compensation data, and/or modulation transfer function compensation data. In some examples, the lens behavior model includes executable algorithms for receiving focusing parameter values and performing a prediction to determine expected values for the focusing parameters. The algorithm may use historical focusing parameter value data and a regression model to determine expected values, for example.

In some examples, the lens behavior model is a lens aging model that contains historical data and/or predicted future values for focusing parameters, as a function of operating time for a lens assembly. Operating time may be measured in reference to a universal time system, such as days, weeks, months, years. Operating time may be an accumulated time representing the time in which an imaging system was turned on and operating. Operating time may be a number of cycles of operation, such as the number of times a variable focus lens assembly has its focus position adjusted.

An example lens aging model compared at process 204 may include values for applied voltage versus fixed focus position as a function of operating time, thereby indicating changes in the applied voltage necessary to maintain a particular focus position as the variable focus lens assembly ages. The aging model may include time based modeling for any number of other focusing parameters as well.

In some examples, the lens behavior model compared at process 204 is a thermal model that contains thermal data for the one or more focusing parameters. Such a model may model changes in focusing parameter values as a function of temperature.

In some examples, the lens behavior model is a drift model that includes lens drift data for the one or more focusing parameters, indicating changes in the focusing parameters depending on the lens position, in particular depending on drift changes in lens position. In some examples, the lens behavior model is a multidimensional model that contains modeling for multiple different variables, including, for example, aging dependence, thermal dependence, drift dependence, and/or any other model behaviors.

From the comparison of the focusing parameters to the lens behavior model, at a process 206 a compensated fixed focus position is determined for the adjustable variable focus lens assembly, where the compensated fixed focus position represents the corrected focus position that the adjustable variable focus lens assembly is to be set at. This compensated fixed focus position may be determined by the lens behavior model, for example, where the determination includes a determination of the changes in focusing parameters that are to be used to achieve the new focus position.

In an example operation, the process 202 determines the initial focus position of a liquid lens. The process 204 determines the focusing parameters that correspond to the initial focus position, such as the voltage as that has been applied to the liquid lens to achieve that initial focus position. The lens behavior model is then used by the process 204 to determine what the actual, desired focus position should be given changes in behavioral conditions of the lens. These changes can be a change in temperature, a change in age/time, and/or a change in drift position. The changes may result from a comparison of a current state of the machine vision system, such as its current temperature or current age/time, in comparison to the a baseline state, such as an initial startup of the machine vision system, a first time use of the machine vision system, a factory released state of the machine vision system, or some other baseline state. The baseline state could be the operating state at any previous point in time, including allowing for continuous monitoring of the operating state, and thus the focusing parameters of the liquid lens. The actual, desired focus position then becomes the new focus position correcting for changes between the operating state and the baseline state that the liquid lens should be set to achieve the desired focusing for imaging purposes. The process 206 determines this compensated fixed focus position and the compensated focusing parameters that will achieve that position. The process 208 sets the liquid lens according to those compensated focusing parameters and captures an image of the object at the compensated focus position. Thus, in this example, the process 200 has adjusted the focus position for the variable focus elements, thereby compensating for lens behavior.

FIG. 3 illustrates is a process 300 that may be implemented by the process 204, in an example implementation. At a process 302, a plurality of images of an object are received and a feature of interest in the plurality of images is identified. The images are preferably images captured under differently operating states of the machine vision system 102, for example, at different points in time or under different lens behavior conditions, such as a different temperatures, different focus positions, etc. In an example, the process 302 deploys imaging processing, feature identification, feature segmentation, and feature registration techniques to identify the feature of interest, in whole or in part, in each of the plurality of images.

To allow for comparing the perform of the machine vision system 102 in imaging at the different operating states corresponding to each image, a process 304 uses an image characteristic (or multiple image characteristics) and then assess the feature of interest in each image using that image characteristic. In the illustrated example, the process 304 may use image contrast determined for all or part of the feature of interest or the MTF determined for all or part of the feature of interest, as the image characteristic. Contrast and MTF are example optical merit functions that can be used as image characteristics. Other image characteristics may be used. With respect to the illustrated example, the contrast of the feature of interest may change under different operating states of the machine vision system, even with the adjustable variable focus lens assembly set to image an object at the same focus position for each of images.

At a process 306, the images are analyzed to determine if there has been a change in the image characteristic across one or more of the images, that is, across one or more operating states of the machine vision system. In the illustrated example, the contrast or MTF for the feature of interest is compared to identify changes. A process 308 then compares the change in the image characteristic, e.g., the contrast and/or the modulation transfer function of the feature of interest, to the lens behavior model and uses the lens behavior model to determine a change in the one or more focusing parameters corresponding to the change in the contrast or the modulation transfer function. Returning to FIG. 2, the change in the one or more focusing parameters is then used to determine the compensated fixed focus position at the process 206.

In some examples, the machine vision system 102 is used to develop a lens behavior model to be used in determining future compensated focus positions. The machine vision system 102, for example, may capture a plurality of images of an object and store values for one or more focusing parameters of the adjustable variable focus lens assembly for each image. With the images captured at different points in time and under different operating states, changes in the focusing parameter values provides portion of a behavior model for a lens. For each image, the machine vision system 102 may determine an image quality for all or some portion of the image. The machine vision system 102 may determine changes in that image quality across the plurality images, thereby providing another portion of a behavior model for a lens. The changes in focusing parameter values and the changes in image quality across multiple images are then used to generate the lens behavior model, where the type of lens behavior model (e.g., aging, thermal, drift, etc.) depends on which focusing parameter or parameters have values that changed corresponding to a change in image quality. As discussed in examples herein that image quality assessment may be made based on contrast or MTF, in some examples.

In various implementations, the present techniques provide a valuable framework for performing small focus compensation in machine vision systems and other imaging systems that require high precision and that are susceptible to performance changes in operation of imaging focusing elements. Indeed, the present techniques are capable of measuring focusing parameters comparing those to a lens behavior model and adjusting a variable focus lens assembly in small focusing adjustments on the orders of a few diopters or less. The compensation focusing may be determined from behavior models on aging, thermal conditions, drift, system boot status, system on/off status, or other factors. It is common in the camera industry to capture multiple images and automatically select the one with best quality. However, the present techniques avoid such brute force, guess work, and can intelligently track focusing and adjusting a focusing sweep based on a variety of lens behavior models, looking for features of interest in an image or image characteristics for an image, including features defined by a user, and tracking changes in those to adjust performance of a variable focus lens assembly, on the fly.

Indeed, in some examples, the process 200 may be used to determine a compensated focusing sweep range, i.e., a new range of focuses that the machine vision system 102 will sweep through to image an object, such as the objects 104 and 106. A focusing sweep range is defined by a first focus position and a second, different focus position. One focus position may be considered the forward focus position and the other the aft focus position, and, in operation, the machine vision system 102 may sweep across the range of focuses defined by these forward and aft positions in capturing an image of the object. Unlike a conventional autofocus system, this focusing sweep range is very small, typically less than +/−1 diopter of optical power. In some examples, the forward focus position and the aft focus position are defined relative to a fixed focus position and these forward and aft focus positions can change with changes in performance of the variable focus lens assembly.

In various examples, the present techniques may use lens behavior models to not only compensate for drift, temperature, time, etc. in determining compensated focus parameters and compensated focus positions, but to determine focus sweep ranges that will be used in finding the compensated focus position. For example, the lens behavior model may be used to determine where a desired focus position is for a machine vision system, by determining, using a lens behavior model, a limited range of focusing positions to sweep across and assessing the resulting performance to identify a desired focus position, where that desired focus position may be a compensated position of a previously attempted focus position or an entirely new desired focus position, for example, as may result during startup of a machine vision system.

To compensate for focusing sweep changes of a variable focus lens assembly, a process 400 in FIG. 4 may be used. In an example, the process 400 may be implemented by the process 206 in FIG. 2. In other examples, the process 400 may be implemented as a standalone process. At a process 402, from the comparison to the lens behavior model that is performed as process 204, a focusing sweep range is defined by selecting a forward focus position forward of the initial fixed focus position from process 202. Further, an aft focus position aft of that initial fixed focus position may be defined. The process 402 may define this position by using a predetermined +/−focus position change, e.g., measured in millimeters forward and aft of the initial focus position. In alternatives examples, the process 402 may instead define a forward focus position voltage and an aft focus position voltage, where these two voltages are voltage applied to an adjustable variable focus lens assembly to achieve the forward and aft focus positions.

To determine a compensated fixed focus position, the process 400, in some examples, determines compensated forward and after focus positions to generate a new focusing sweep range, whereby this new focusing sweep range can be used to determine the ultimately compensated fixed focus position. For example, a machine vision system may have such performance degradation over time such that a focus position initially used by the system to capture images mounted on a conveyor for inspection is no longer the correct focus position. Aging or changes in thermal conditions have altered the performance of a liquid lens or other variable focus element. Under normal operation, the machine vision system, in initially trying to find its fixed focus position for imaging may sweep through a small range from a forward focus position to an aft focus position. But if the performance of the liquid lens has altered greatly enough, the initial sweep range may no longer contain the desired focus position. That is, the performance alteration has also affected the focusing sweep range. In response, at a process 404, from the comparison to the lens behavior model, compensated forward and aft focus positions are determined. Or, alternatively, in some examples, compensated forward and aft focus position voltages are determined from the comparison to the lens behavior model. For example, the lens behavior model, as a thermal model, may indicate the forward and aft focus positions should be both be compensated by +1 diopter and −1 diopter, respectively, under a current temperature parameter value. In yet other examples, the process 404 is optional, such that compensated forward and aft focus positions may not be determined, but instead, predetermined forward and aft focus positions may be used.

At a process 406, a plurality of images of an object are then captured at different focus positions by sweeping the variable focus elements 118, e.g., a liquid lens, from the compensated forward focus position (or voltage) to the compensated aft focus position (or voltage). The images may be captured at the forward and aft focus positions and any number of other focus positions in between, depending the granularity of adjustments than can be one the variable focus elements 118 and the speed with which the system is to determine a fixed focus position. The capture of images may correspond to a focusing sweep voltage range, such that a compensated voltage is applied to the variable focus element 118 to sweep the focus thereof from the forward to the after focus positions. At a process 408, these images may be analyzed to identify an optimum image and the corresponding focus position for that optimum image. That focus position is then set by the process 408 as the compensated fixed focus potion (or voltage) that is to be used for future image capture.

While the process 400 is described as determining compensated positions, the process 400 may be used to determine initial positions, i.e., an initial forward focus position, initial aft focus position, and initial fixed focus position. For example, initial positions may be determined upon startup of a machine vision system. In an example, one or more focus parameters may be determined upon startup and compared to one or more lens behavior models, using a modified version of process 402. An initial forward focus position and an initial aft focus position then may be determined, e.g., at process 404, after which images of an object are captured at different focus position over the resulting focus sweep range, at process 406, and process 408 determines the initial fixed focus position corresponding to the desired one of those images.

In some examples, a machine vision method is therefore provided for a machine vision system having an adjustable variable focus lens assembly. One or more current operating conditions of the adjustable variable focus lens assembly are identified. To achieve these current operating conditions, the lens assembly has a first operating parameter value set. By comparing these current operating conditions to a lens behavior model, a compensated parameter value set is determined, for example, to compensate for age related changes to the lens assembly. The operating parameter value set may include fixed focus position, focusing sweep distance range, or voltage values or other values associated with controlling operation of an actuator and/or lens assembly.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for tracking focus of an adjustable variable focus lens-based imaging system, the method comprising:

identifying, in the imaging system, an initial fixed focus position of an adjustable variable focus lens assembly of the imaging system for capturing an image of an object;

determining one or more focusing parameters of the adjustable variable focus lens assembly for the initial fixed focus position and comparing the one or more focusing parameters to a lens behavior model for the adjustable variable focus lens assembly;

determining a compensated fixed focus position of the imaging system based on the comparison to the lens behavior model; and capturing, via the imaging system, at least one image of the object at the compensated fixed focus position.

2. The method of claim 1, wherein the one or more focusing parameters comprise at least one of time, current temperature of the adjustable variable focus lens assembly, diopter of the adjustable variable focus lens assembly, voltage associated with the initial fixed focus position, voltage sweep associated with the initial fixed focus position, and modulation transfer function of at least a portion of an image captured by the imaging system at the initial fixed focus position.

3. The method of claim 1, wherein determining the compensated fixed focus position of the imaging system based on the comparison to the lens behavior model comprises:

based on the comparison to the lens behavior model, identifying a focusing sweep range defined by a forward focus position forward of the initial fixed focus position and an aft focus position aft of the initial fixed focus position;

determining a compensated forward focus position and a compensated aft focus position based on the comparison to the lens aging model;

capturing, via the imaging system, a plurality of images of the object at focus positions at and/or between the compensated forward focus position and the compensated aft focus position; and determining the compensated fixed focus position as one of the focus positions.

4. The method of claim 1, wherein the initial fixed focus position is associated with an initial reference voltage, and wherein determining the compensated fixed focus position of the imaging system comprises:

based on the comparison to the lens behavior model, determining a forward focus position voltage and an aft focus position voltage;

capturing, via the imaging system, a plurality of images of the object at different focus positions by sweeping the imaging system across voltages at and/or between the forward focus position voltage and the aft focus position voltage; and determining the compensated fixed focus position as one of the different focus positions.

5. The method of claim 1, wherein the initial fixed focus position is associated with an initial reference voltage, and wherein determining the compensated fixed focus position of the imaging system comprises:

identifying a focusing sweep voltage range defined by a forward focus position voltage corresponding to a forward focus position forward of the initial fixed focus position and by an aft focus position voltage corresponding to an aft focus position aft of the initial fixed focus position;

determining a compensated forward focus position voltage and a compensated aft focus position voltage based on the comparison to the lens behavior model;

capturing, via the imaging system, a plurality of images of the object at different focus positions by sweeping the imaging system across voltages at and/or between the forward focus position voltage and the aft focus position voltage, wherein the different focus positions are between +1 diopter and −1 diopter of a center focus position; and determining the compensated fixed focus position as one of the different focus positions.

6. The method of claim 1, further comprising:

capturing a plurality of images of objects for machine vision analysis and storing one or more focusing parameters of the adjustable variable focus lens for each of the plurality of images captured for machine vision analysis;

determining image quality changes occurring over the plurality of images captured for machine vision analysis; and developing the lens behavior model based the image quality changes, wherein the image quality changes are changes in contrast or modulation transfer function over a feature of interest in the plurality of images.

7. The method of claim 1, wherein the lens behavior model comprises time based compensation data, temperature based compensation data, diopter based compensation data, voltage based compensation data, voltage sweep based compensation data, and/or modulation transfer function based compensation data.

8. The method of claim 1, wherein the adjustable variable focus lens assembly comprises a liquid lens.

9. The method of claim 1, wherein the lens behavior model is an aging model comprising historical data for the one or more focusing parameters of the adjustable variable focus lens assembly.

10. The method of claim 1, wherein the lens behavior model is a thermal model comprising thermal data for the one or more focusing parameters of the adjustable variable focus lens assembly.

11. The method of claim 1, wherein the lens behavior model is a drift model comprising lens drift data for the one or more focusing parameters of the adjustable variable focus lens assembly.

12. The method of claim 1, wherein comparing the one or more focusing parameters to the lens behavior model comprises;

capturing a plurality of images of the object and identifying a feature of interest in the plurality of images;

determining a contrast or modulation transfer function corresponding to the feature of interest for each of the plurality of images;

determining a change in the contrast or the modulation transfer function between the plurality of images; and comparing the change in the contrast or the modulation transfer function to the lens behavior model and determining a change in the one or more focusing parameters corresponding to the change in the contrast or the modulation transfer function.

13. An imaging system comprising:

an imaging assembly having an adjustable variable focus lens assembly;

one or more processors; and a non-transitory machine-readable memory storing machine-readable instructions that, when executed by the one or more processors, cause the imaging system to:

identify an initial fixed focus position of the adjustable variable focus lens assembly for capturing an image of an object;

determine one or more focusing parameters of the adjustable variable focus lens assembly for the initial fixed focus position and compare the one or more focusing parameters to a lens behavior model for the adjustable variable focus lens assembly;

determine a compensated fixed focus position of the imaging system based on the comparison to the lens behavior model; and capture at least one image of the object at the compensated fixed focus position.

14. The imaging system of claim 13, wherein the one or more focusing parameters comprise at least one of time, current temperature of the adjustable variable focus lens assembly, diopter of the adjustable variable focus lens assembly, voltage associated with the initial fixed focus position, voltage sweep associated with the initial fixed focus position, and modulation transfer function of an image captured by the imaging system at the initial fixed focus position.

15. The imaging system of claim 13, the memory storing further machine-readable instructions that, when executed by the one or more processors, cause the imaging system to:

based on the comparison to the lens behavior model, identify a focusing sweep range defined by a forward focus position forward of the initial fixed focus position and an aft focus position aft of the initial fixed focus position;

determine a compensated forward focus position and a compensated aft focus position based on the comparison to the lens behavior model;

capture a plurality of images of the object at focus positions at and/or between the compensated forward focus position and the compensated aft focus position; and determine the compensated fixed focus position as one of the focus positions.

16. The imaging system of claim 13, the memory storing further machine-readable instructions that, when executed by the one or more processors, cause the imaging system to:

based on the comparison to the lens behavior model, determine a forward focus position voltage and an aft forward position voltage; and capture a plurality of images of the object at different focus positions by sweeping the imaging system across voltages at and/or between the forward focus position voltage and the aft focus position voltage; and determine the compensated fixed focus position as one of the different focus positions.

17. The imaging system of claim 13, wherein the initial fixed focus position is associated with an initial reference voltage, the memory storing further machine-readable instructions that, when executed by the one or more processors, cause the imaging system to:

identify a focusing sweep voltage range defined by a forward focus position voltage corresponding to a forward focus position forward of the initial fixed focus position and by an aft focus position voltage corresponding to an aft focus position aft of the initial fixed focus position;

determine a compensated forward focus position voltage and a compensated aft focus position voltage based on the comparison to the lens behavior model;

capture a plurality of images of the object at different focus positions by sweeping the imaging system across voltages at and/or between the forward focus position voltage and the aft focus position voltage; and determine the compensated fixed focus position as one of the different focus positions.

18. The imaging system of claim 13, the memory storing further machine-readable instructions that, when executed by the one or more processors, cause the imaging system to:

capture a plurality of images of objects for machine vision analysis and storing one or more focusing parameters of the adjustable variable focus lens for each of the plurality of images captured for machine vision analysis;

determine image quality changes occurring over the plurality of images captured for machine vision analysis; and develop the lens behavior model based the image quality changes, wherein the image quality changes are changes in contrast or modulation transfer function over a feature of interest in the plurality of images.

19. The imaging system of claim 13, wherein the lens behavior model comprises time based compensation data, temperature based compensation data, diopter based compensation data, voltage based compensation data, voltage sweep based compensation data, and/or modulation transfer function based compensation data.

20. The imaging system of claim 13, wherein the lens behavior model is an aging model comprising historical data for the one or more focusing parameters of the adjustable variable focus lens assembly.

21. The imaging system of claim 13, wherein the lens behavior model is a thermal model comprising thermal data for the one or more focusing parameters of the adjustable variable focus lens assembly.

22. The imaging system of claim 13, wherein the lens behavior model is a drift model comprising lens drift data for the one or more focusing parameters of the adjustable variable focus lens assembly.

23. The imaging system of claim 13, the memory storing further machine-readable instructions that, when executed by the one or more processors, cause the imaging system to:

capture a plurality of images of the object and identify a feature of interest in the plurality of images;

determine a contrast or modulation transfer function corresponding to the feature of interest for each of the plurality of images; and determine a change in the contrast or the modulation transfer function between the plurality of images and determine a change in the one or more focusing parameters corresponding to the change in the contrast or the modulation transfer function; and compare the change in the contrast or the modulation transfer function to the lens behavior model.

24. The imaging system of claim 13, wherein the adjustable variable focus lens assembly comprises a liquid lens.

25. The imaging system of claim 13, wherein the imaging assembly is a barcode reader.

26. The imaging system of claim 13, wherein the imaging assembly is a machine vision system.

27. A machine vision method comprising:

identifying, in a machine vision system having an adjustable variable focus lens assembly, one or more current operating conditions of the adjustable variable focus lens assembly, the adjustable variable focus lens assembly having a first operating parameter value set;

comparing the one or more current operating conditions to a lens behavior model for the adjustable variable focus lens assembly;

in response to the comparison, determining a compensated parameter value set for compensating for age related changes to the adjustable variable focus lens assembly; and capturing, via the machine vision system, at least one image of an object using the compensated parameter value set.

28. The machine vision method of claim 27, wherein the one or more current operating conditions of the machine vision system comprise at least one of time, current temperature of the adjustable variable focus lens assembly, diopter of the adjustable variable focus lens assembly, voltage associated with the initial fixed focus position, voltage sweep of the adjustable variable focus lens assembly, and modulation transfer function of an image captured by the adjustable variable focus lens assembly.

29. The machine vision method of claim 27, wherein first operating parameter value set comprises a first fixed focus position of the adjustable variable focus lens assembly, and wherein the compensated parameter value set comprises a compensated fixed focus position different than the first fixed focus position.

30. The machine vision method of claim 27, wherein first operating parameter value set comprises a focusing sweep distance range, and wherein the compensated parameter value set comprises a compensated focusing sweep distance range different than the focusing sweep distance range.

31. The machine vision method of claim 27, wherein first operating parameter value set comprises a voltage associated with a first fixed focus position of the adjustable variable focus lens assembly, and wherein the compensated parameter value set comprises a compensated voltage associated with a compensated fixed focus position different than the first fixed focus position.

32. A machine vision system comprising:

an imaging assembly having an adjustable variable focus lens assembly;

one or more processors; and a non-transitory machine-readable memory storing machine-readable instructions that, when executed by the one or more processors, cause the machine vision system to:

identify one or more current operating conditions of the adjustable variable focus lens assembly, the adjustable variable focus lens assembly having a first operating parameter value set;

compare the one or more current operating conditions to a lens behavior model for the adjustable variable focus lens assembly; and in response to the comparison, determine a compensated parameter value set for compensating for age related changes to the adjustable variable focus lens assembly; and capture, via the machine vision system, at least one image of an object using the compensated parameter value set.

33. The machine vision system of claim 32, wherein the one or more current operating conditions of the machine vision system comprise at least one of time, current temperature of the adjustable variable focus lens assembly, diopter of the adjustable variable focus lens assembly, voltage associated with the initial fixed focus position, voltage sweep of the adjustable variable focus lens assembly, and modulation transfer function of an image captured by the adjustable variable focus lens assembly.

34. The machine vision system of claim 32, wherein first operating parameter value set comprises a first fixed focus position of the adjustable variable focus lens assembly, and wherein the compensated parameter value set comprises a compensated fixed focus position different than the first fixed focus position.

35. The machine vision system of claim 32, wherein first operating parameter value set comprises a focusing sweep distance range, and wherein the compensated parameter value set comprises a compensated focusing sweep distance range different than the focusing sweep distance range.

36. The machine vision system of claim 32, wherein first operating parameter value set comprises a voltage associated with a first fixed focus position of the adjustable variable focus lens assembly, and wherein the compensated parameter value set comprises a compensated voltage associated with a compensated fixed focus position different than the first fixed focus position.

* * * * *